(12) United States Patent
Nunnink et al.

(10) Patent No.: US 8,181,878 B2
(45) Date of Patent: May 22, 2012

(54) METHOD AND APPARATUS FOR PROVIDING A FOCUS INDICATION FOR OPTICAL IMAGING OF VISUAL CODES

(75) Inventors: Laurens Nunnink, Simpelveld (NL); William H. Equitz, Waban, MA (US); Joerg Kuechen, Herzogenrath (DE)

(73) Assignee: Cognex Technology and Investment Corporation, MT View, CA (US)

( * ) Notice: Subject to any disclaimer, the term of this patent is extended or adjusted under 35 U.S.C. 154(b) by 616 days.

(21) Appl. No.: 11/339,183

(22) Filed: Jan. 25, 2006

(65) Prior Publication Data

US 2007/0170259 A1    Jul. 26, 2007

(51) Int. Cl.
G06K 7/10    (2006.01)
(52) U.S. Cl. ............ 235/462.22; 235/462.2; 235/462.21
(58) Field of Classification Search ............... 235/462.2, 235/462.21, 462.22, 462.09
See application file for complete search history.

(56) References Cited

U.S. PATENT DOCUMENTS

| | | |
|---|---|---|
| 3,940,777 A | 2/1976 | Komine |
| 4,072,396 A | 2/1978 | Ross |
| 4,160,590 A | 7/1979 | Reynard |
| 4,314,752 A | 2/1982 | Ishizaka et al. |
| 4,478,491 A | 10/1984 | Kawai |
| 4,490,018 A | 12/1984 | Yokotsuka |
| 4,494,828 A | 1/1985 | Masumoto et al. |
| 4,591,253 A | 5/1986 | Hecker et al. |
| 4,871,238 A | 10/1989 | Sato et al. |
| 4,877,949 A | 10/1989 | Danielson et al. |
| 5,019,699 A | 5/1991 | Koenck |
| 5,155,343 A | 10/1992 | Chandler |
| 5,247,152 A | 9/1993 | Swartz et al. |
| 5,308,966 A | 5/1994 | Danielson et al. |
| 5,313,053 A | 5/1994 | Koenck |
| 5,331,178 A | 7/1994 | San't Anselmo et al. |
| 5,349,172 A | 9/1994 | Roustaei |
| 5,365,597 A | 11/1994 | Holeva |
| 5,378,883 A | 1/1995 | Batterman et al. |

(Continued)

FOREIGN PATENT DOCUMENTS

EP    00745951    12/1996

(Continued)

OTHER PUBLICATIONS

Cognex Corporation, DataMan 100 SHD/C-Mount Kit Removal Instructions, 590-7042, 2007.

(Continued)

*Primary Examiner* — Ahshik Kim
(74) *Attorney, Agent, or Firm* — Michael A. Jaskolski

(57) ABSTRACT

A method and apparatus for indicating an in-focus or an out-of-focus condition for an imaging device (1, 2) in an optical reading and decoding apparatus (20) for receiving a coded image from a target area (29) on an article or package. In the method of the invention, two beams of light (27, 28) are generated to provide two illuminated aiming marks (32, 33) on the target. An in-focus condition is indicated when the two aiming marks are in a pre-defined spatial relationship relative to each other on the target. The in-focus condition or an out-of-focus condition can be signaled by controlling attributes of aiming marks (32, 33) or by controlling attributes of status indicator LEDs (12) on the apparatus (20) or by controlling an audible sound.

29 Claims, 3 Drawing Sheets

U.S. PATENT DOCUMENTS

| | | | |
|---|---|---|---|
| 5,399,846 A | 3/1995 | Pavlidis et al. | |
| 5,471,043 A | 11/1995 | Knapp et al. | |
| 5,473,150 A | 12/1995 | Huhn et al. | |
| 5,500,516 A | 3/1996 | Durbin | |
| 5,513,264 A | 4/1996 | Wang et al. | |
| 5,569,902 A | 10/1996 | Wood et al. | |
| 5,572,006 A | 11/1996 | Wang et al. | |
| 5,587,843 A | 12/1996 | Chen | |
| 5,596,368 A | 1/1997 | Capper et al. | |
| 5,598,007 A | 1/1997 | Bunce et al. | |
| 5,627,360 A * | 5/1997 | Rudeen | 235/462.21 |
| 5,640,001 A | 6/1997 | Danielson et al. | |
| 5,659,167 A | 8/1997 | Wang et al. | |
| 5,672,858 A | 9/1997 | Li et al. | |
| 5,715,095 A | 2/1998 | Hiratsuka et al. | |
| 5,734,153 A | 3/1998 | Swartz et al. | |
| 5,756,981 A | 5/1998 | Roustaei et al. | |
| 5,773,810 A | 6/1998 | Hussey et al. | |
| 5,783,811 A | 7/1998 | Feng et al. | |
| 5,786,586 A | 7/1998 | Pidhirny et al. | |
| 5,793,033 A | 8/1998 | Feng et al. | |
| 5,811,828 A | 9/1998 | Laser | |
| 5,825,006 A | 10/1998 | Longacre, Jr. et al. | |
| 5,825,559 A | 10/1998 | Johnson et al. | |
| 5,834,754 A | 11/1998 | Feng et al. | |
| 5,844,229 A | 12/1998 | Rockstein et al. | |
| 5,945,658 A | 8/1999 | Salatto et al. | |
| 5,949,057 A | 9/1999 | Feng | |
| 5,969,321 A | 10/1999 | Danielson et al. | |
| 5,992,751 A | 11/1999 | Laser | |
| 6,060,722 A | 5/2000 | Havens et al. | |
| 6,066,857 A | 5/2000 | Fantone et al. | |
| 6,073,851 A | 6/2000 | Olmstead et al. | |
| 6,098,887 A | 8/2000 | Figarella et al. | |
| 6,179,208 B1 | 1/2001 | Feng | |
| 6,223,986 B1 | 5/2001 | Bobba et al. | |
| 6,223,988 B1 | 5/2001 | Batterman et al. | |
| 6,285,787 B1 | 9/2001 | Kawachi et al. | |
| 6,340,114 B1 | 1/2002 | Correa et al. | |
| 6,347,163 B2 | 2/2002 | Roustaei et al. | |
| 6,431,452 B2 | 8/2002 | Feng | |
| 6,445,450 B1 | 9/2002 | Matsumoto | |
| 6,449,430 B1 | 9/2002 | Tasaka et al. | |
| 6,474,556 B2 | 11/2002 | Dickson et al. | |
| 6,527,183 B2 | 3/2003 | Bard et al. | |
| 6,607,132 B1 | 8/2003 | Dvorkis et al. | |
| 6,636,298 B1 | 10/2003 | Bachelder et al. | |
| 6,651,886 B2 | 11/2003 | Gurevich et al. | |
| 6,651,888 B2 | 11/2003 | Gurevich et al. | |
| 6,681,994 B1 | 1/2004 | Koenck | |
| 6,689,998 B1 | 2/2004 | Bremer | |
| 6,712,270 B2 | 3/2004 | Leach | |
| 6,729,546 B2 | 5/2004 | Roustaei | |
| 6,765,393 B2 | 7/2004 | Pierenkemper et al. | |
| 6,805,295 B2 | 10/2004 | Barkan et al. | |
| 6,808,114 B1 | 10/2004 | Palestini et al. | |
| 6,809,847 B2 | 10/2004 | McQueen | |
| 6,827,270 B2 | 12/2004 | Yomogida et al. | |
| 6,832,725 B2 | 12/2004 | Gardiner | |
| 6,837,433 B2 | 1/2005 | Jam et al. | |
| 6,845,915 B2 | 1/2005 | Krichever et al. | |
| 6,866,198 B2 | 3/2005 | Patel et al. | |
| 6,877,664 B1 | 4/2005 | Oliva | |
| 6,891,679 B2 | 5/2005 | Atarashi et al. | |
| 6,918,538 B2 | 7/2005 | Breytman et al. | |
| 6,974,085 B1 | 12/2005 | Koenck | |
| 6,997,385 B2 | 2/2006 | Palestini et al. | |
| 7,007,843 B2 | 3/2006 | Poloniewicz | |
| 7,025,271 B2 | 4/2006 | Dvorkis et al. | |
| 7,025,272 B2 | 4/2006 | Yavid et al. | |
| 7,025,273 B2 | 4/2006 | Breytman et al. | |
| 7,055,747 B2 | 6/2006 | Havens et al. | |
| 7,063,256 B2 | 6/2006 | Anderson et al. | |
| 7,073,715 B2 | 7/2006 | Patel et al. | |
| 7,075,663 B2 | 7/2006 | Canini et al. | |
| 7,077,325 B2 | 7/2006 | Tan et al. | |
| 7,090,137 B1 | 8/2006 | Bennett | |
| 7,128,266 B2 | 10/2006 | Zhu et al. | |
| 7,147,159 B2 | 12/2006 | Longacre et al. | |
| 7,201,318 B2 | 4/2007 | Craen et al. | |
| 7,222,793 B2 | 5/2007 | Patel | |
| 7,224,540 B2 | 5/2007 | Olmstead et al. | |
| 7,264,162 B2 | 9/2007 | Barkan | |
| 7,296,749 B2 | 11/2007 | Massieu | |
| 7,315,241 B1 | 1/2008 | Daily et al. | |
| 7,387,246 B2 | 6/2008 | Palestini et al. | |
| 7,395,970 B2 | 7/2008 | Poloniewicz et al. | |
| 7,454,841 B2 | 11/2008 | Burns et al. | |
| 7,549,582 B1 | 6/2009 | Nunnink | |
| 7,686,223 B2 | 3/2010 | Vinogradov et al. | |
| 2002/0014532 A1 | 2/2002 | Yomogida et al. | |
| 2002/0034320 A1 | 3/2002 | Mann | |
| 2002/0039099 A1 | 4/2002 | Harper | |
| 2002/0074403 A1 | 6/2002 | Krichever et al. | |
| 2002/0171745 A1 | 11/2002 | Ehrhart | |
| 2002/0191309 A1 | 12/2002 | Taylor et al. | |
| 2003/0019934 A1 | 1/2003 | Hunter et al. | |
| 2003/0020491 A1 | 1/2003 | Pierenkemper et al. | |
| 2003/0062413 A1 | 4/2003 | Gardiner et al. | |
| 2003/0201327 A1 | 10/2003 | Jam et al. | |
| 2003/0205620 A1 | 11/2003 | Byun et al. | |
| 2003/0226895 A1 | 12/2003 | Havens et al. | |
| 2004/0020990 A1 | 2/2004 | Havens et al. | |
| 2004/0238637 A1 | 12/2004 | Russell et al. | |
| 2005/0035204 A1 | 2/2005 | Knappert et al. | |
| 2005/0045725 A1 | 3/2005 | Gurevich et al. | |
| 2005/0103851 A1 | 5/2005 | Zhu et al. | |
| 2005/0103854 A1 | 5/2005 | Zhu et al. | |
| 2005/0103858 A1 | 5/2005 | Zhu et al. | |
| 2055/0103857 | 5/2005 | Zhu et al. | |
| 2005/0133601 A1 | 6/2005 | Yomogida et al. | |
| 2005/0167504 A1 | 8/2005 | Meier et al. | |
| 2005/0180037 A1 | 8/2005 | Masterson | |
| 2005/0199725 A1 | 9/2005 | Caraen et al. | |
| 2006/0027659 A1 | 2/2006 | Patel et al. | |
| 2006/0034596 A1 | 2/2006 | Yamazaki et al. | |
| 2006/0043187 A1 | 3/2006 | He et al. | |
| 2006/0043191 A1 | 3/2006 | Patel et al. | |
| 2006/0055819 A1 | 3/2006 | Pokrovsky et al. | |
| 2006/0060653 A1 | 3/2006 | Wittenberg et al. | |
| 2006/0081712 A1 | 4/2006 | Rudeen et al. | |
| 2006/0213994 A1 | 9/2006 | Faiz et al. | |
| 2007/0057067 A1 | 3/2007 | He | |
| 2007/0131770 A1 | 6/2007 | Nunnink | |
| 2007/0164115 A1 | 7/2007 | Joseph et al. | |
| 2007/0241195 A1 | 10/2007 | Hussey et al. | |
| 2008/0121168 A1 | 5/2008 | Ryznar et al. | |
| 2009/0159684 A1 | 6/2009 | Barber et al. | |
| 2009/0166424 A1 | 7/2009 | Gerst et al. | |
| 2009/0200380 A1 | 8/2009 | Longacre et al. | |

FOREIGN PATENT DOCUMENTS

| | | |
|---|---|---|
| EP | 00755018 | 1/1997 |
| EP | 00957448 | 11/1999 |
| EP | 00574024 | 9/2001 |
| EP | 01308875 | 5/2003 |
| EP | 01519298 | 3/2005 |
| JP | 10134133 | 5/1998 |
| WO | 9603708 | 2/1996 |
| WO | 9816896 | 4/1998 |
| WO | 0016241 | 3/2000 |
| WO | 03062956 | 7/2003 |
| WO | 03063064 | 7/2003 |
| WO | 2005041111 | 5/2005 |
| WO | 2005050390 | 6/2005 |
| WO | 2005073895 | 8/2005 |
| WO | 2006004858 | 1/2006 |
| WO | 2006026239 | 3/2006 |

OTHER PUBLICATIONS

Cognex Corporation, Cognex Expands Reading Capability, Natick, MA, Publication Date Oct. 9, 2007.

* cited by examiner

METHOD AND APPARATUS FOR PROVIDING A FOCUS INDICATION FOR OPTICAL IMAGING OF VISUAL CODES

TECHNICAL FIELD

This invention relates to a method and apparatus for determining an in-focus distance for optically sensing a visual code on a package or article using two non-intersecting beams.

DESCRIPTION OF THE BACKGROUND ART

Optical imaging systems are widely used for reading coded patterns on packages or articles. One of the most common of these is the bar code reader. Such a device can be a portable handheld device or a fixed mount device mounted along a conveyor for packages or articles. As with other imaging devices, results are improved if the device is the proper distance from the article to be scanned or read, so that the image is "in focus."

Known prior optical decoding systems have used a crosshair-type illumination to properly aim a handheld reader at an object to be read, as disclosed in Feng, U.S. Pat. No. 5,783,811. Swartz et al., U.S. Pat. No. 5,734,153, disclosed that an aiming beam could provide one or more illuminated spots or a line on the target area. Roustei, U.S. Pat. No. 6,347,163, disclosed splitting an aiming beam into two generally parallel beamlets for framing the sides of a field of view. Beams that have been used for determining a focus distance have generally used a triangulation method involving intersection of the two beams or some other intersection method.

It is desired to provide a new and improved focusing system to signal a user that the target area is in focus and that the imaging data being read is good data.

None of these references provide or suggest the solution which is the subject of the present invention.

SUMMARY OF THE INVENTION

The invention relates to a method and apparatus for indicating an in-focus or an out-of-focus condition for a two-dimensional imaging device in an optical reading and decoding apparatus for receiving a coded image from a target area on an article or package.

In the method of the invention, two beams of light are generated to provide two illuminated aiming marks on the target. An in-focus condition is indicated when the two aiming marks are in a pre-defined spatial relationship relative to each other on the target.

In one preferred embodiment, this pre-defined relationship is provided when the aiming marks are two bar-shaped marks that are aligned along a common axis, and when a gap between the two bar-shaped aiming marks is approximately equal to the length of one or both of aiming marks.

In a second preferred embodiment, this pre-defined relationship is provided when the aiming marks are two bar-shaped marks that are positioned above and below, respectively, a center of the field of view for the imaging device and are in end-to-end parallel alignment with no right or left offset relative to each other.

The in-focus or out-of-focus condition can also be indicated to a user by other visual indicators, such as by changing a color of one of the aiming marks or by blinking at least one of the aiming marks or by executing these operations with additional visual or audible indicators.

An apparatus according to the invention comprises an imaging device for receiving a coded image from the target within a field of view for the imaging device, two spaced apart; aiming beam devices which transmit at least two optical beams to illuminate the target with two spaced apart, aiming marks, and a processor for receiving an image including the aiming marks from the imaging device, for calculating an in-focus condition based on a parameter of the image sensed by the imaging device, and for signaling an in-focus condition or an out-of-focus condition by controlling attributes of at least one of the aiming marks or of other visual or audible indicators.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
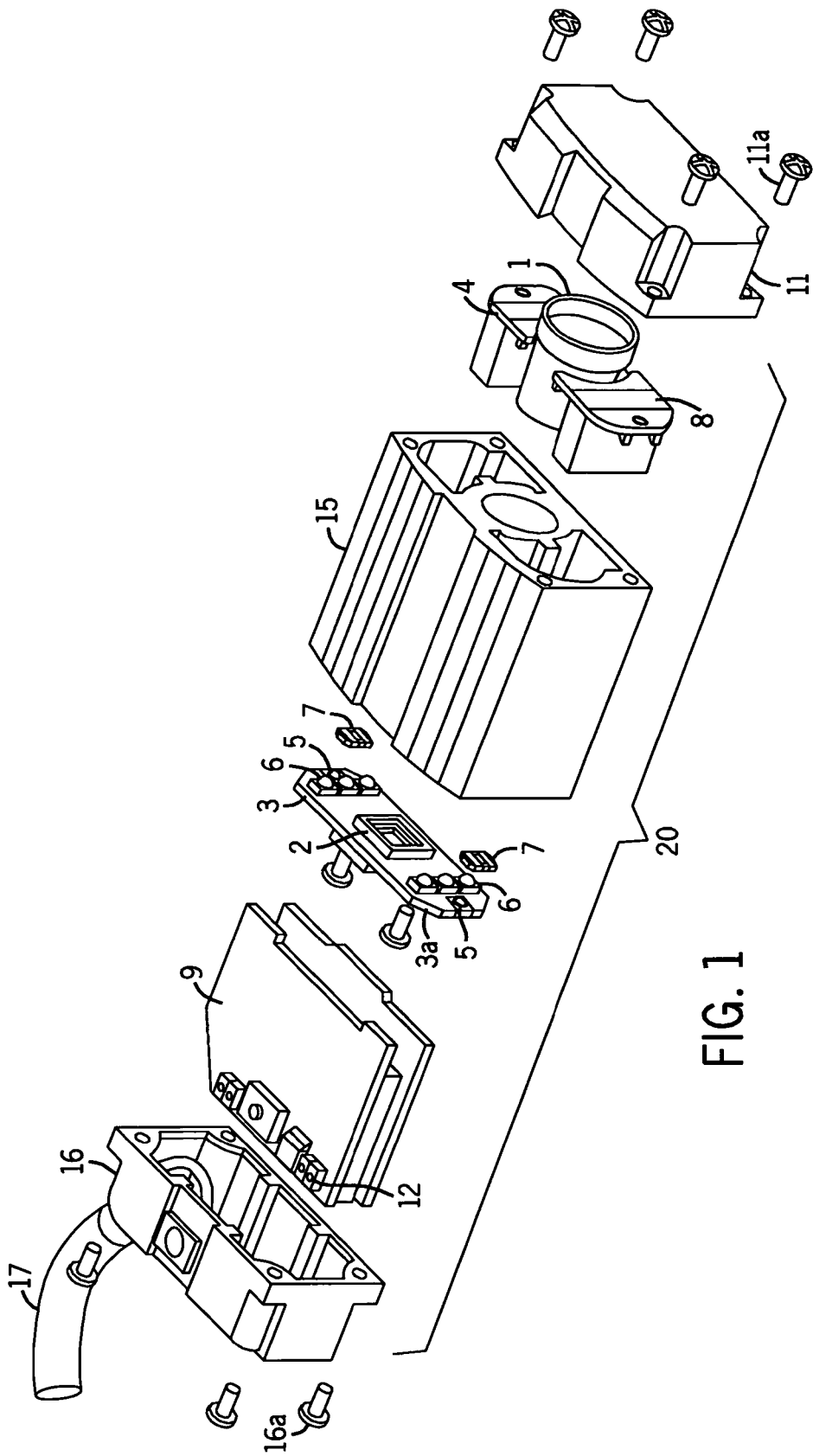
FIG. 1 is an exploded perspective view of a fixed mount reading and decoding apparatus for practicing the present invention.
Figure 2:
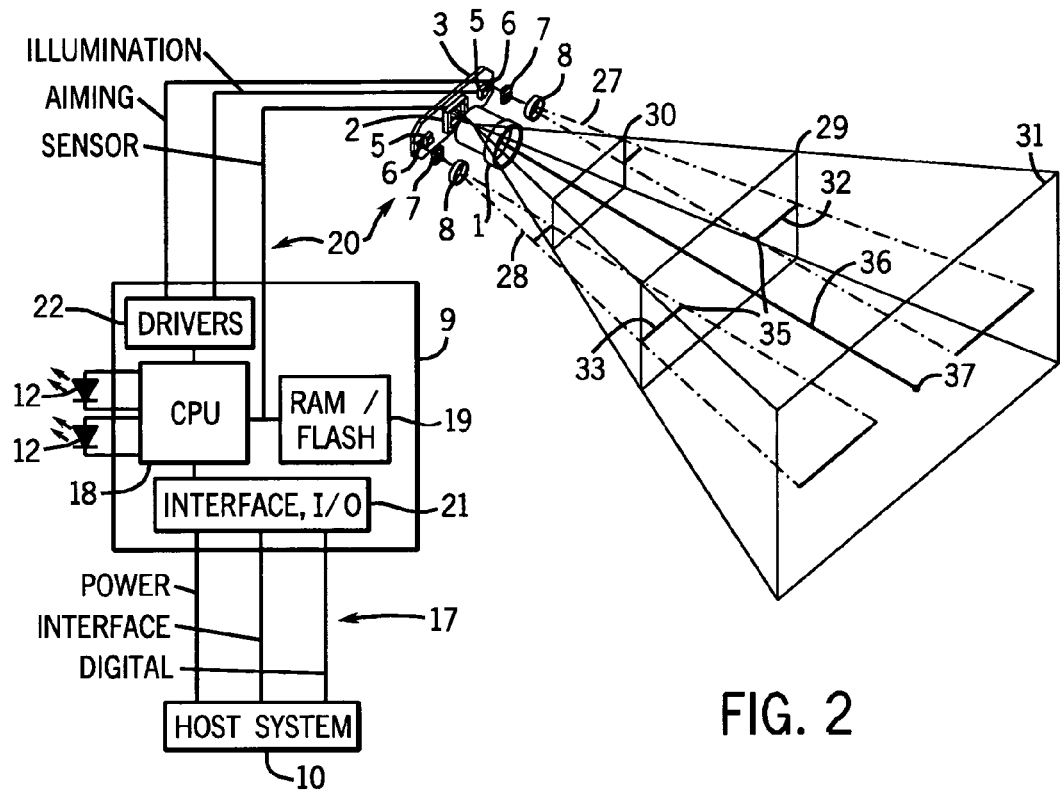
FIG. 2 is an electrical schematic view of the reading and decoding apparatus of FIG. 1 with an optical schematic view of a first example of the aiming optics of the present invention.
Figure 3:
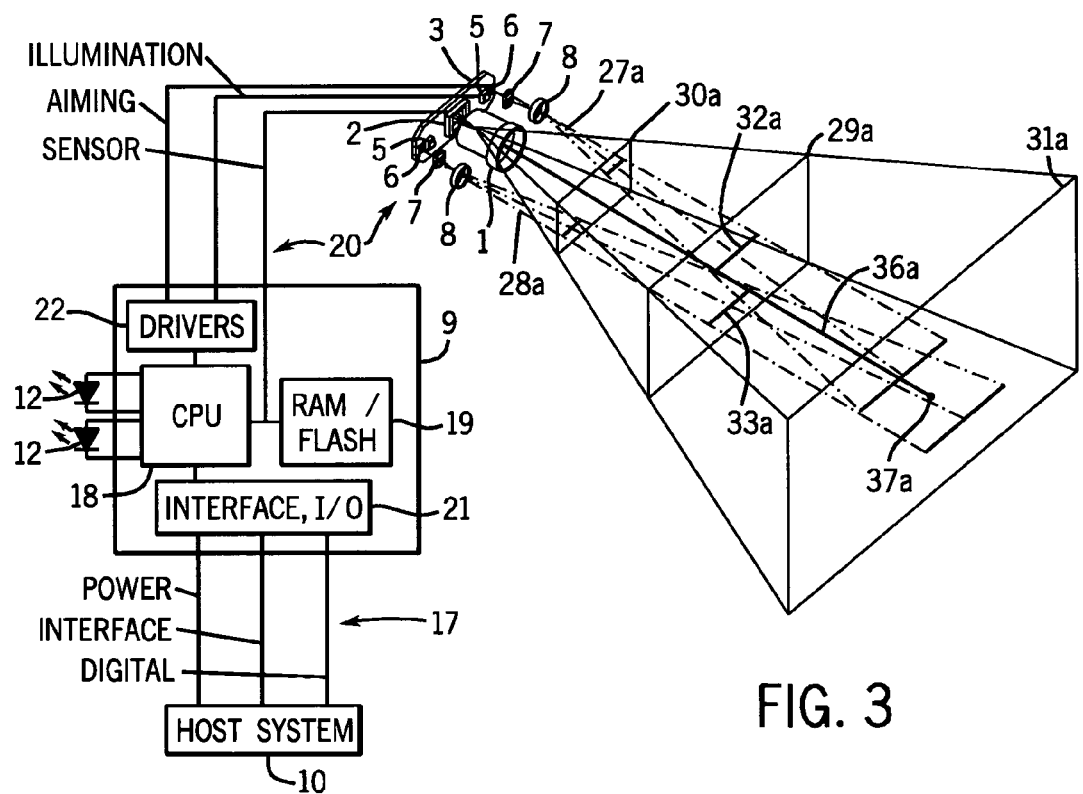
FIG. 3 is an electrical schematic view of the reading and decoding apparatus of FIG. 1 with an optical schematic view showing a modification of the aiming optics of the present invention.

Referring to FIG. 1, a fixed mount optical reading apparatus 20 of the present invention includes an extruded aluminum central housing body 15. A molded plastic support 4 is mounted on a front of the housing body 15 and provides support for a plurality of optic elements 8 for diffusing and shaping beams of light. An imaging lens 1 is supported by a lens holder integrated with the body 15. The elements 1, 4 and 8 are enclosed and protected by a front transparent cover 11 which is fastened on the body 15 with threaded fasteners 11a. An imaging circuit board 3 supports a CMOS imaging sensor 2 (FIGS. 2, 3), preferably a global shutter for detecting a two-dimensional image that is viewed through the lens 1. Such a sensor is available commercially as a Micron MT9V022 sensor with shutter (752×480 pixels, 0 fps). The term "two-dimensional" denotes an imaging sensor that produces an array of pixel data in contrast to laser scanning devices that produce a one-dimensional scan of an image. The imaging circuit board 3 is attached to a rear end of the body 15 with threaded fasteners 3a. In alternative embodiments, a CCD array or other known imaging sensor can be used as the sensor 2. A processor assembly 9 is seen as a pair of closely spaced and parallel circuit boards connected by a ribbon connector. The processor assembly 9 includes one or more indicator LEDs 12 that can be viewed through a rear cover 16. The imaging circuit board 3 and the processor assembly 9 are inserted in the body 15 from the rear and are enclosed by the transparent cover 16 attached to the rear of the body 15 with fasteners 16a. This rear cover 16 may have a port (not shown) for entry or connection of a communication interface cable or it may enclose an internal antenna for reception of wireless communications (this wired or wireless communication link being numbered 17 in FIGS. 2, 3) for communication with a host system 10, as seen in FIGS. 2 and 3. The communication interface may be Ethernet, USB 2.0 or another suitable data network, including a wireless network, or it may be an RS-232 communication link. This communication link includes power (PWR) lines (5 to 24 Volt) interface (INTFC) signal lines (USB, RS232), and digital (DIGITAL) lines for two digital sensing inputs and two digital status outputs. Although this apparatus 20 is intended for fixed mounting, the description herein in equally applicable to a handheld unit, with the addition of a suitable handle.

The optical reading and decoding apparatus 20 operates for imaging and decoding high contrast two-dimensional coded patterns in various symbologies. The codes are typically printed on labels or packaging or directly on articles, which can be stationary or in motion when the code is imaged and decoded. The objects from which the codes are imaged will be more generally referred to as "targets." In a specific example, the optical reading apparatus 20 reads bar codes on packaging for articles, as well as other coded patterns including a matrix-coded pattern.

Figure 4:
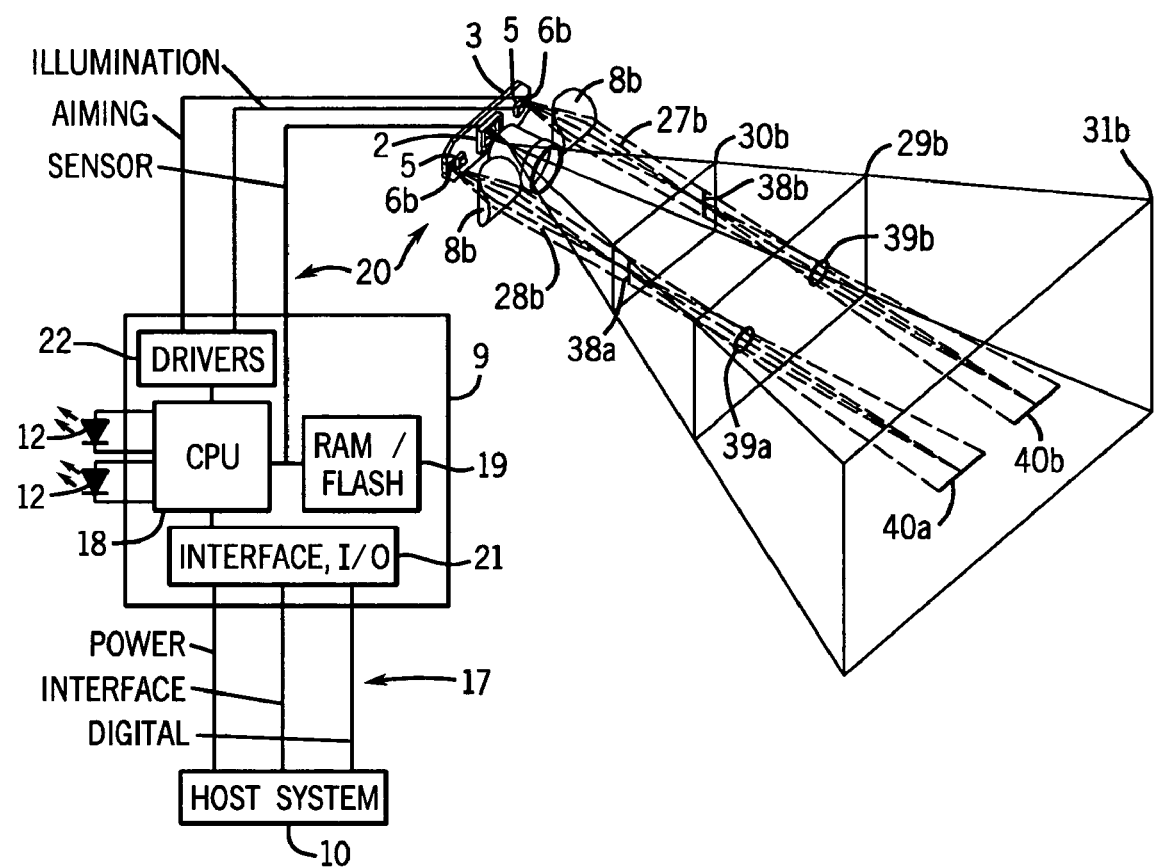
FIG. 4 is the electrical schematic view of the reading and decoding apparatus of FIG. 1 with an optical schematic view showing a second modification of the aiming optics of the present invention.

As seen in FIG. 1, the CMOS imaging sensor 2 is mounted on the imaging circuit board 3, along with six image illumination LEDs 5 (represented by LEDs 5 in FIGS. 2-4) and two aiming LEDs 6. As seen in FIGS. 2-4, imaging data from the CMOS sensor 2 are transmitted to the processor assembly 9. This assembly 9 includes a microelectronic processor (CPU) 18, which is preferably a digital signal processor such as the Blackfin BF531 or BF533 available from Analog Devices. This assembly 9 also includes a RAM (random access memory) for storing imaging data and a flash memory for storing an updateable control program, both indicated by block 19. The processor 18 will execute a stored control program to carry out the operations described herein. The processor assembly 9 (FIGS. 2 and 3) also includes a suitable network I/O interface 21 for interfacing a network wire or wireless link to the host system 10, and suitable driver circuits 22 for interfacing to the imaging sensor 2, and a plurality of illumination LEDs 5, and a plurality of aiming LEDs 6 on the imaging circuit board 3. The processor assembly 9 will receive image data from the imaging sensor 2, analyze this image for coded patterns, decode the patterns and signal the decoded information to the host system 10, which is typically a computer which adds an additional visual display and user input capabilities to the overall system 10, 20.

FIG. 2 shows several two-dimensional field-of-view (FOV) planes 29, 30 and 31 located at respective focal distances from the lens 1. It shall be assumed that the FOV plane 29 is located at the in-focus distance, whereas FOV plane 30 is too close and FOV plane 31 is too far away to be in focus for the imaging elements 1, 2.

The illumination LEDs 5 (FIGS. 2-4) are on the imaging circuit board 3 and aimed to illuminate a target area on the article or package corresponding to the field of view in planes 29, 30 and 31 at varying distances from the lens 1. Additional optical diffusion devices of a type known in the art would be mounted on the lens support 4 and used to distribute the light from the illumination LEDs 5 uniformly over the field of view plane 30, 29 and 31 on the target.

The aiming LEDs 6 (FIGS. 2 and 3) are also mounted on the imaging circuit board 3, in a spaced apart position, to generate two spaced apart beams of light. These beams of light are aimed through rectangular slits in two apertured discs 7 and then through two aiming lens elements 8. This causes the beams to be shaped as two spaced apart bar-shaped illumination beams 27, 28 which are seen as illuminated bar-shaped marks 32, 33 within the FOV target area 29, 30 and 31, such as on a package or article being imaged to detect a code.

At the optimum distance represented by FOV plane 29, the aiming pattern comprises two illuminated bars 32, 33, aligned along a substantially horizontal axis 34 and spaced apart by a gap 35, which is preferably of a same length as the length of each of the illuminated bars 32, 33. At the closer distance represented by FOV plane 30, the bar-shaped marks 32, 33 are separated by a larger gap than gap 35 and may lie outside the field of view 30. At the farther focal distance, represented by FOV plane 31, the bars 32, 33 are separated by a smaller gap than gap 35 and are well within the field of view 31. The two beams of light 27, 28 are aimed so as not to intersect each other and so as not to cross a center line 36 through a center 37 of the field of view 30, 29, 31 for the imaging device provided by the lens 1 and the CMOS sensor 2.

The positioning of the optical reading apparatus 20 at the optimum focal distance to the FOV plane 29 can be detected by the processor 18 by measuring the black-and-white contrast in the image at varying distances. When this contrast is the greatest, the image of the coded pattern will be in focus. Another way of detecting the focal distance is determining that the spatial relationship between the aiming marks is signaling an in-focus condition. This in-focus condition or an out-of-focus condition can be signaled by the processor 18 to the user in one of many ways. The in-focus condition can be signaled or indicated to the user by adjusting the width of the gap 35 between the two bars 32, 33 to be the same as the length or either one or both of the bars 32, 33. The in-focus position can be signaled by a change of color of the aiming marks 32, 33 from red to green, for example. The in-focus position can also be signaled by a change in a logic state of one of digital outputs, labeled "DIGITAL" in FIGS. 2-4. This signal can be used by the host 10 to control equipment associated with optical reading apparatus 20 or the target. On the other hand, an out-of-focus condition can be signaled by blinking one or both of the aiming marks 32, 33. This can be carried out by controlling a duty cycle in a power circuit supplying power to the aiming LEDs 6. The in-focus position can also be signaled by a change of color from red to green, for example, of one or two indicator LEDs 12, which are observed through the rear window cover 16 of the apparatus 20. On the other hand, an out-of-focus condition can be signaled by blinking one of the indicator LEDs 12. The in-focus condition can also be signaled by an audible alarm either alone or in combination of one of the above visual indicators.

In a second embodiment shown in FIG. 3, the aiming pattern comprises two illuminated bar-shaped marks 32a, 33a that are substantially horizontal and are positioned above and below, respectively, a central axis 36a of the three-dimensional field of view 29a, 30a, 31a for the imaging device 1, 2. At the optimum distance represented by FOV plane 29a, the bar-shaped marks 32a, 33a are in end-to-end parallel alignment. At the closer distance represented by FOV plane 30, the illuminated bars 32a, 33a are offset, the top bar 32a to the left and the bottom bar 33a to the right. At the farther distance represented by FOV plane 31, the bars 32a, 33a are offset with the top bar 32a to the right (as seen from the imaging device) and the bottom bar 33a to the left of the central axis 36a. The two aiming beams 27a, 28a are aimed so as not to intersect each other and so as not to cross a center line axis 36a through a center of the field of view 37a for the imaging device 1, 2.

The positioning of the optical reading apparatus 20 at the optimum distance 29a in FIG. 3 can be detected by the processor 18 by measuring the black-and-white contrast in the image at varying distances. When the contrast is the greatest the image will be in focus. When this contrast is the greatest, the image of the coded pattern will be in focus. This in-focus condition or an out-of-focus condition can then be signaled by the processor 18 to the user in one of many ways. The in-focus position can be signaled or indicated to the user by adjusting the end-to-end parallel alignment of the two bars 32a, 33a. The in-focus position can be signaled by a change of color of the aiming marks 32a, 33a from red to green, for example. On the other hand, an out-of-focus condition can be signaled by blinking one or both of the aiming marks 32a, 33a. This can be carried out by controlling a duty cycle in a power circuit supplying power to the aiming LEDs 6. The in-focus position can also be signaled by a change of color from red to green, for example, of one of the indicator LEDs 12, which are observed through the rear window cover 16 of the apparatus 20. On the other hand, an out-of-focus condition can be signaled by blinking one of the indicator LEDs 12. The in-focus condition can also be signaled by an audible alarm either alone or in confirmation of one of the above visual indicators.

FIG. 4 illustrates a third variation of the aiming optics for this optical reading apparatus 20. The processor assembly 9 is the same as described for FIGS. 2 and 3. The aiming beams 27b, 28b, are provided with aiming lens 8b, to provide aiming marks in the form of two vertical bars 38a, 38b at FOV plane 30b shorter than the focal plane 29b, two round spots 39a, 39b at the in-focus FOV plane 29b, and two horizontal bars 40a, 40b on a common axis at FOV plane 31b beyond the focal plane 29b. The aiming light sources 6b can be LEDs or VLD (Visible Laser Diode), and the aiming lenses 8b are lenses with cylindrical surfaces, with an axis of these surfaces in orthogonal directions. The optical effect provided by these lenses 8b is called astigmatism.

In this variation, the focus is signaled by the shape of the aiming marks, rather than by a change of color or by blinking elements in the pattern. However, the LEDs 12 can still be blinked or caused to change color as a supplemental signal of an out-of-focus or in-focus condition, respectively.

If the aiming light source is a Visible Laser Diode, the lenses 8b can be replaced by Holographic Optical Elements (HOEs) with the same functionality. Instead of refracting the light by the shape of the surface, Holographic Optical Elements operate on the principle of diffraction. The advantage of HOE's is that they can be produced as very thin and lightweight elements.

This has been a description of the preferred embodiments, but it will be apparent to those with skill in the art to which the invention pertains that various modifications may be made to these specific embodiments without departing from the spirit of the present invention, and that such modifications are intended to be encompassed by the following claims.

We claim:

1. A method of indicating an in-focus condition for a two-dimensional imaging device that senses a coded pattern on a target, the method comprising:
    generating two beams of light from two spaced apart aiming light sources;
    aiming and shaping the two beams of light to produce two spaced apart illuminated aiming marks on the target without an intersection of said two respective beams with each other or with a central axis passing through a center of a field of view on the target; and
    signaling at least one of an in-focus condition or an out-of-focus condition when the two illuminated aiming marks are in a pre-defined relationship relative to each other on the target and inside the field of view;
    wherein the in-focus condition or an out-of-focus condition is signaled through a digital output to an external host.

2. The method of claim 1, wherein the two beams of light are shaped into two illuminated bar-shaped aiming marks on the target that are parallel and spaced above and below a center of a field of view on the target, respectively, and wherein an in-focus condition is signaled by an end-to-end alignment of the two illuminated bar-shaped aiming marks.

3. The method of claim 1, wherein the two beams of light are shaped into two aiming marks of a shape determined by an in-focus condition, a beyond-focus-distance condition, or a shorter-than-focus-distance condition of the target in relation to the imaging device.

4. The method of claim 1, 2, or 3, wherein an out-of-focus condition is signaled by a blinking condition of a light-emitting device other than the two spaced apart aiming light sources.

5. The method of claim 1, 2, or 3, wherein the in-focus condition is indicated by an audible sound.

6. The method of claim 1 wherein the external host is a device that is external to the imaging device.

7. A method of indicating an in-focus condition for a two-dimensional imaging device that senses a coded pattern on a target, the method comprising:
    generating two beams of light from two spaced apart aiming light sources;
    aiming and shaping the two beams of light to produce two spaced apart illuminated aiming marks on the target without an intersection of said two respective beams with each other or with a central axis passing through a center of a field of view on the target; and
    signaling at least one of an in-focus condition or an out-of-focus when the two illuminated aiming marks are in a pre-defined relationship to each other on the target and inside the field of view;
    wherein the two beams of light are shaped into two illuminated bar-shaped aiming marks on the target which are aligned along a common axis, and wherein an in-focus condition is signaled by a space between the two bar-shaped marks along said axis, when said space is approximately equal in length to at least one, or to each, of the two illuminated bar-shaped aiming marks.

8. The method of claim 7 wherein the in-focus condition or an out-of-focus condition is signaled through a digital output to an external host.

9. The method of claim 7 wherein an in-focus condition is signaled by at least one of (i) a change of color of at least one light-emitting device other than the two spaced apart aiming light sources and (ii) an audible sound.

10. The method of claim 7 wherein an out-of-focus condition is signaled by a blinking condition of a light-emitting device other than the two spaced apart aiming light sources.

11. The method of claim 7 wherein an out-of-focus condition is signaled by a blinking condition of a light-emitting device other than the two spaced apart aiming light sources.

12. The method of claim 7 wherein the two beams of light are shaped into two illuminated bar-shaped aiming marks on the target that are parallel and spaced above and below a center of a field of view on the target, respectively, and wherein an in-focus condition is signaled by an end-to-end alignment of the two illuminated bar-shaped aiming marks.

13. The method of claim 7 wherein the two beams of light are shaped into two aiming marks of a shaped determined by an in-focus condition, a beyond-focus condition, or a shorter than focus-distance condition of the target in relation to the imaging device.

14. A method of indicating an in-focus condition for a two-dimensional imaging device that senses a coded pattern on a target, the method comprising:
    generating two beams of light from two spaced apart aiming light sources;
    aiming and shaping the two beams of light to produce two spaced apart illuminated aiming marks on the targt without an intersection of said two respective beams with each other or with a central axis passing through a center of a field of view on the target; and
    signaling at least one of an in-focus condition or an out-of-focus condition when the two illuminated aiming marks are in a pre-defined relationship relative to each other on the target and inside the field of view;
    wherein an in-focus condition is signaled by at least one of (i) a change of color of at least one of the two illuminated aiming marks, and (ii) a change of color of at least one light-emitting device other than the two spaced apart aiming light sources.

15. The method of claim 14 wherein an in-focus condition is signaled by a change of color of at least one light-emitting device other than the two spaced apart aiming light sources.

16. A method of indicating an in-focus condition for a two-dimensional imaging device that senses a coded pattern on a target, the method comprising:
    generating two beams of light from two spaced apart aiming light sources;
    aiming and shaping the two beams of light to produce two spaced apart illuminated aiming marks on the target without an intersection of said two respective beams with each other or with a central axis passing through a center of a field of view on the target; and
    signaling at least one of an in-focus condition or an out-of-focus condition when the two illuminated aiming marks are in a pre-defined relationship relative to each other on the target and inside the field of view;
    wherein an out-of-focus condition is signaled by a blinking condition of at least one of the two illuminated aiming marks.

17. An imaging apparatus for reading a coded pattern on a target, the imaging apparatus comprising:
    a two-dimensional imaging device for sensing the coded pattern on the target within a field of view for the imaging device;
    two spaced apart, aiming beam devices which transmit at least two respective beams of light to provide two spaced apart aiming marks on the target; and
    a processor for receiving images of the coded pattern from the imaging device, the processor calculating an in-focus condition based on a parameter of an image sensed by the imaging device, and the processor signaling at least one of an in-focus condition or an out-of-focus condition based on a relative position of the aiming marks inside the field of view;
    wherein an in-focus condition is signaled by a change of color of at least one of the two aiming marks.

18. The apparatus of claim 17, further comprising aiming and shaping devices for shaping the two respective beams of light to provide two spaced apart and parallel aiming marks on the target that are positioned respectively above and below a center of the field of view for the imaging device; and wherein an in-focus condition is signaled by an end-to-end parallel alignment of the two bar-shaped aiming marks.

19. The apparatus of claim 17, further comprising shaping devices for shaping the two respective beams of light to a respective shape determined by an in-focus condition, a beyond-focus-distance condition, or a shorter-than-focus-distance condition of the target in relation to the imaging device.

20. The apparatus of claim 17, 18 or 19, further comprising a status-indicating light-emitting device, other than the aiming beam devices, that is controlled by the processor, and wherein an in-focus condition is signaled by a change of color of said status-indicating light-emitting device.

21. The apparatus of claim 17, 18 or 19, further comprising a status-indicating light-emitting device, other than the aiming beam devices, that is controlled by the processor, and wherein an out-of-focus condition is signaled by a blinking of the status-indicating light-emitting device.

22. The apparatus of claim 17, 18 or 19, wherein the in-focus condition is indicated by an audible sound.

23. The apparatus of claim 17, wherein the two beams are aimed so as not intersect each other or so as not to intersect a center line through a center of the field of view for the imaging device.

24. An imaging apparatus for reading a coded pattern on a target, the imaging apparatus comprising:
    a two-dimensional imaging device for sensing the coded patttern on the target within a field of view for the imaging device;
    two spaced apart, aiming beam devices which transmit at least two respective beams of light to provide two spaced apart aiming marks on the target;
    a processor for receiving images of the coded pattern from the imaging device, the processor calculating an in-focus condition based on a parameter of an image sensed by the imaging device, and the processor signaling at least of an in-focus condition or an out-of-focus condition based on a relative position of the aiming marks inside the field of view; and
    shaping devices for shaping the two aiming marks as bar-shaped marks, and wherein an in-focus condition is signaled by alignment of the two bar-shaped aiming marks along a common axis, and by a gap between the two bar-shaped aiming marks being approximately equal in length to at least one, or to each, of the two bar-shaped aiming marks.

25. The apparatus of claim 24 wherein an in-focus condition is signaled by a change of color of at least one of the two aiming marks.

26. The apparatus of claim 24 wherein an in-focus condition is signaled by at least one of (i) a change of color of at least one light-emitting device other than the two spaced apart aiming light sources and (ii) an audible sound.

27. An imaging apparatus for reading a coded pattern on a target, the imaging apparatus comprising;
    a two-dimensional imaging device for sensing the coded pattern on the target within a field of view for the imaging device;
    two spaced apart, aiming beam devices which transmit at least two respective beams of light to provide two spaced apart aiming marks on the target; and
    a processor for receiving images of the coded pattern from the imaging device, the processor calculating an in-focus condition based on a parameter of an image sensed by the imaging device, and the processor signaling at least one of an in-focus condition or an out-of-focus condition based on a relative position of the aiming marks inside the field of view;

wherein an out-of-focus condition is signaled by a blinking of at least one of the two aiming marks.

28. A method of indicating an in-focus condition for a two-dimensional imaging device that senses a coded pattern on a target, the method comprising:

generating two beams of light from two spaced apart aiming light sources;

aiming and shaping the two beams of light to produce two spaced apart illuminated aiming marks on the target without an intersection of said two respective beams with each other or with a central axis passing through a center of a field of view on the target; and signaling at least one of an in-focus condition or an out-of-focus condition when the two illuminated aiming marks are in a pre-defined relationship relative to each other on the target and inside the field of view;

wherein the two beams of light are shaped into two illuminated bar-shaped aiming marks on the target which are aligned along a common axis, and wherein an in-focus condition is signaled by a space between the two bar-shaped marks along said axis when the space is a specific dimension relative to at least one of the bar-shaped aiming marks.

29. An imaging apparatus for reading a coded pattern on a target, the imaging apparatus comprising:

a two-dimensional imaging device for sensing the coded pattern on the target within a field of view for the imaging device;

two spaced apart, aiming beam devices which transmit at least two respective beams of light to provide two spaced apart aiming marks on the target;

a processor for receiving images of the coded pattern from the imaging device, the processor calculating an in-focus condition based on a parameter of an image sensed by the imaging device, and the processor signaling at least one of an in-focus condition or an out-of-focus condition based on a relative position of the aiming marks inside the field of view; and shaping devices for shaping the two aiming marks as bar-shaped marks, and wherein an in-focus condition is signaled by alignment of the two bar-shaped aiming marks along a common axis, and by a gap between the two bar-shaped aiming marks being a specific dimension relative to at least one of the bar-shaped aiming marks.

* * * * *